United States Patent [19]

Nakano et al.

[11] Patent Number: 4,868,033

[45] Date of Patent: Sep. 19, 1989

[54] LAMINATES AND FORMINGS MADE FROM THE SAME

[75] Inventors: Toshihiko Nakano; Fumiaki Nagase, both of Kashiwara; Eiichi Takeuchi, Osaka; Mamoru Kamada; Hideyo Shigematsu, both of Nara, all of Japan

[73] Assignee: Toyo Aluminum Kabushiki Kaisha, Osaka, Japan

[21] Appl. No.: 214,358

[22] Filed: Jul. 1, 1988

Related U.S. Application Data

[63] Continuation-in-part of Ser. No. 923,548, Oct. 27, 1986, Pat. No. 4,767,673.

[30] Foreign Application Priority Data

Oct. 28, 1985 [JP] Japan ............... 60-242454
Feb. 24, 1986 [JP] Japan ............... 61-39393
Apr. 8, 1986 [JP] Japan ............... 61-82463
Jul. 3, 1986 [JP] Japan ............... 61-158312

[51] Int. Cl.$^4$ ............... B32B 3/00; B32B 15/08; B32B 31/00
[52] U.S. Cl. ............... 428/201; 428/34.9; 428/35.7; 428/209; 428/423.7; 428/424.2; 428/424.4; 428/424.6; 428/424.8; 428/425.8; 428/447; 428/450; 428/451; 428/458; 428/461; 428/475.2; 428/476.3; 428/483; 428/515; 428/516; 428/518; 428/520; 428/542.2; 428/913; 156/85; 156/291; 156/233

[58] Field of Search ............... 428/198, 201, 209, 148, 428/913, 458, 34.9, 214, 474.4, 216, 474.7, 446, 450, 542.8, 475.2, 446, 451, 423.7, 424.2, 447, 424.4, 424.6, 424.8, 425.8, 461, 463, 480, 483, 515, 516, 518, 570, 35.2, 35.7, 542.2, 476.3; 174/DIG. 8; 156/85, 291, 309.6, 233

[56] References Cited

U.S. PATENT DOCUMENTS

| | | | |
|---|---|---|---|
| 2,876,067 | 3/1959 | Nagel et al. | 156/85 |
| 3,442,736 | 5/1969 | Duns | 156/85 |
| 3,574,109 | 4/1971 | Yoshikawa | 156/85 |
| 3,607,602 | 9/1971 | Greskiewicz | 156/85 |
| 3,655,502 | 4/1972 | Yoshikawa | 428/198 |
| 3,874,966 | 4/1975 | Garcia | 156/85 |
| 4,378,393 | 3/1983 | Smuckler | 156/85 |
| 4,440,821 | 4/1984 | Komura | 428/913 |
| 4,767,673 | 8/1988 | Nakano et al. | 428/458 |

*Primary Examiner*—Ellis P. Robinson
*Assistant Examiner*—Donald J. Loney
*Attorney, Agent, or Firm*—Armstrong, Nikaido, Marmelstein, Kubovcik & Murray

[57] ABSTRACT

Laminates comprising a film of heat-shrinkable synthetic resin and a metallic foil or metallized plastic film laminated to the resin film through a bonding layer which comprises a discontinuous layer of a synthetic resin which flows at a temperature for heat shrinkage and an adhesive layer which maintains its adhesive strength at that temperature. Upon heat shrinkage, the metallic foil or metallized plastic film will wrinkle at the portions in contact with the synthetic resin which is not highly adhesive at the temperature for heat shrinkage. The heat-shrunk laminate can be formed into a casing or container such as an electromagnetic interference shield, a packaging material, and decorative material.

7 Claims, 4 Drawing Sheets

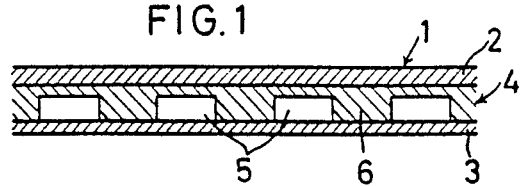
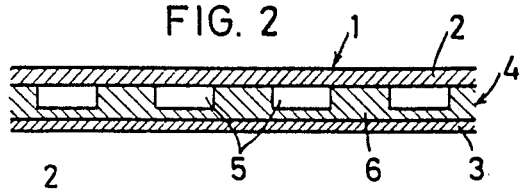
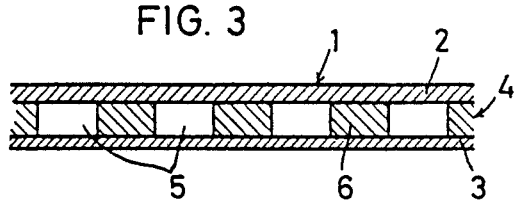
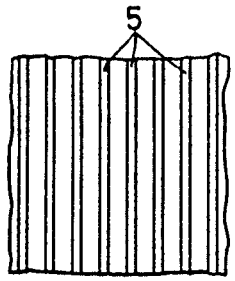 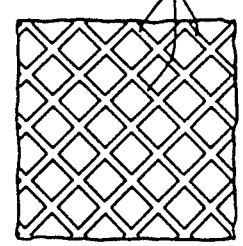 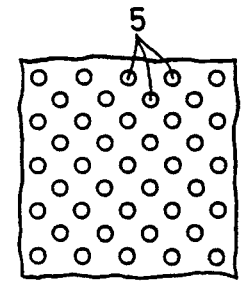
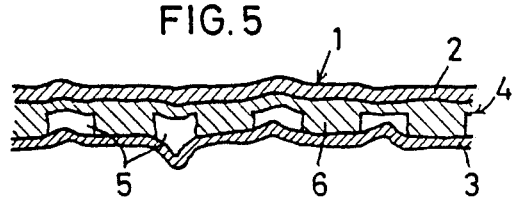
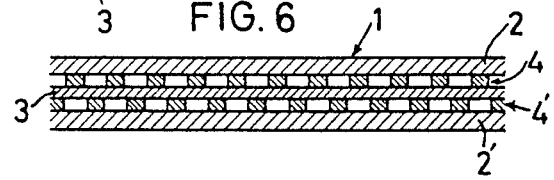
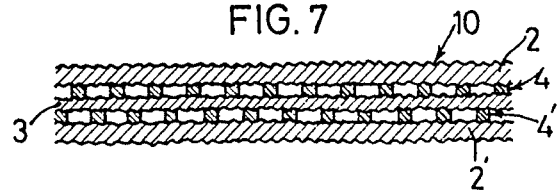

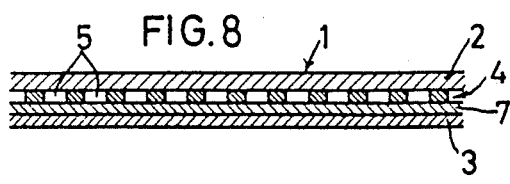
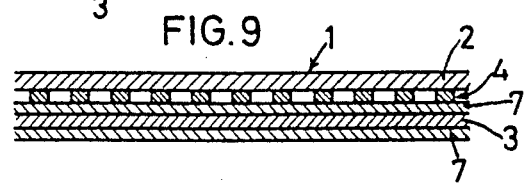
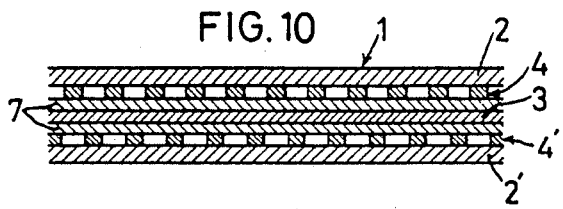
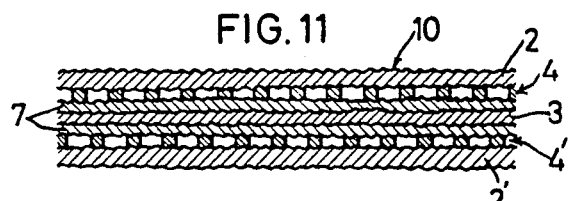
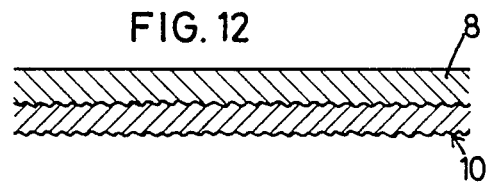
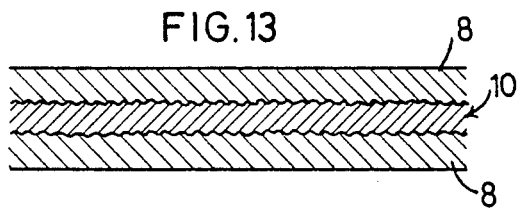
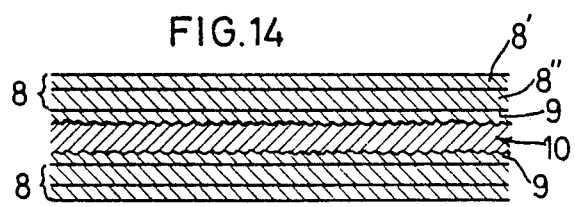

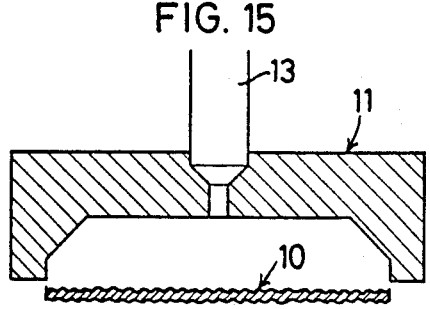
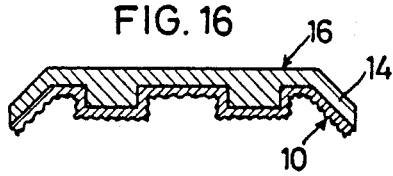
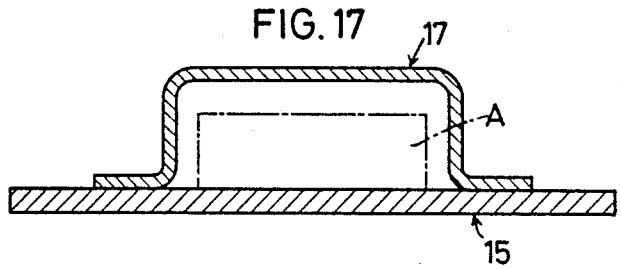
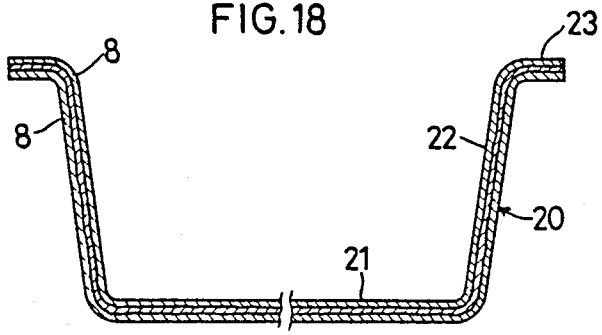

LAMINATES AND FORMINGS MADE FROM THE SAME

This application is a continuation-in-part of patent application Ser. No. 923,548, now U.S. Pat. No. 4,767,673 filed Oct. 27, 1986, and allowed.

The present invention relates to laminates and formings made from the same for use as containers, electromagnetic interference shields, packaging material, decoration materials, etc.

Japanese Patent Non-examined publication No. 50-106783 discloses a composite film for use as a packaging material comprising a heat-shrinkable film and a flexible film partially bonded together. The composite film subjected to heat shrinkage is said to have an increased elasticity and better heat insulation because air cushioning chambers partitioned by the bonding areas are formed. However, since the air cushioning chambers communicate with one another if some bonding pattern is used, water could penetrate into the air cushioning chambers, causing delamination e.g. during retort sterilization. Also, particularly if metallic foil is used as the flexible film, corrosion could occur due to the presence of air, regardless of whether or not the air cushioning chambers communicate with one another. Another problem is that the bonding strength is insufficient because the laminating materials are not bonded but merely superposed.

In producing formings by such a method as vacuum forming, pressure forming and insert injection molding, the materials for a laminate consisting of a metallic foil and synthetic resin film have to have a sufficient plasticity. Otherwise, it is likely that cracks or splits are formed in the metallic foil. Therefore, from a laminate consisting of a metallic foil and a synthetic resin film, containers having a good barrier property particularly to light have not been obtained. Also, as for housings or casings !or electrical and electronic devices or circuits, formings having a good shielding property to electromagnetic interference have not been obtained.

An object of the present invention is to provide laminates which have a good bonding strength and are not liable to cause corrosion or delamination by retort sterilization.

Another object of the present invention is to provide a laminate which will not have its metallic foil broken or coming off even if it undergoes treatment such as shrinkage, cutting or forming.

A further object of the present invention is to provide an electromagnetic interference shielding material which can be formed into containers for food or medicines having a good barrier property or into casings or housings which are of a complicated shape and have a good antistatic property and electromagnetic interference shielding property.

In accordance with the present invention, there is provided a laminate produced by laminating a film of a heat-shrinkable synthetic resin to at least one side of a metallic foil through a solid bonding layer to form a laminate, and subjecting said laminate to heat shrinkage, characterised in that said solid bonding layer comprises a discontinuous layer of a synthetic resin which flows at the temperature used for heat shrinkage of said heat-shrinkable synthetic resin and a layer of an adhesive which maintains its adhesive strength t the temperature used for heat shrinkage.

The laminate may further comprise a layer of a thermoplastic synthetic resin covering at least one whole surface of the metallic foil.

A layer of a thermoplastic synthetic resin may be laminated to at least one side of the heat-shrunk laminate.

In one aspect of the present invention, there are provided formings produced by forming the heat-shrunk laminate by vacuum forming, pressure forming or insert injection molding.

Due to the fact that according to the present invention a metallic foil is laminated to a heat-shrinkable synthetic resin film through a bonding layer which is solid with substantially no vacant spaces, the metallic foil is bonded to the synthetic resin film over its entire surface. This assures a high bonding strength and avoids the possibility of air or water invading the inside of the laminate, causing delamination or corrosion. Also, due to the fact that fine wrinkles are formed on the surfaces of the metallic foil, the laminate produced by heat shrinking has an increased decorative effect.

Another advantage is that the wrinkles on the metallic foil allow it to withstand a strain of up to 50% during forming without breakdown Thus, the laminate can be formed into a complicated shape. A metallic foil intrinsically has a superior barrier property and electromagnetic interference shielding property. Such properties are maintained on the formings because forming will not cause damage of the metallic foil.

The heat-shrunk laminate having a layer of thermoplastic synthetic resin on one or both of its sides will have a better flexibility or ductility. Thus, better formings can be obtained.

As for the embodiments in which the metallic foil has its both sides covered with synthetic resin, they have a better electrical insulation, do not present a risk of the metallic foil corroding or its electromagnetic interference shielding property being impaired during handling.

Other objects and advantages of the present invention will become apparent from the following description taken with reference to the accompanying drawings, in which:

FIGS. 1-3 are sectional views of the first to third embodiments of the laminates;

FIG. 4 are plane views showing three examples of the patterns of the bonding layer;

FIG. 5 is a sectional view of the embodiment of FIG. 1 after heat shrinkage;

FIG. 6 is a sectional view of the fourth embodiment of the laminate;

FIG. 7 is a sectional view of the embodiment of FIG. 6 after heat shrinkage;

FIGS. 8-10 are sectional views of the fifth to seventh embodiments of the laminate;

FIG. 11 is a sectional view of the embodiment of FIG. 10 after heat shrinkage;

FIGS. 12-14 are sectional views of the eighth to tenth embodiments;

FIG. 15 is a sectional view of an example of an arrangement for injection molding;

FIG. 16 is a sectional view of the forming produced by use of the arrangement of FIG. 15;

FIGS. 17 and 18 are sectional views of two examples of the formed casings;

Figure 19:
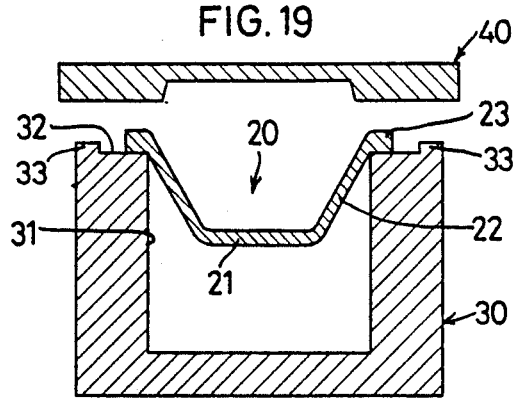
FIG. 19 is a sectional view of a device for working the flange of the casing of FIG. 18.
Figure 20:
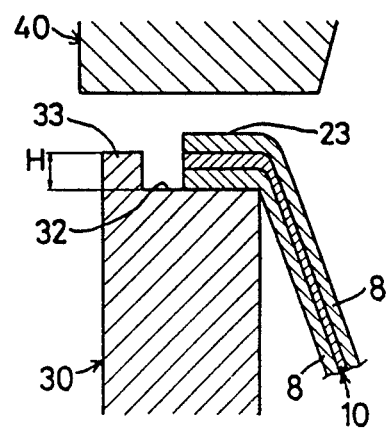
FIGS. 20 and 21 are enlarged sectional views of the device of FIG. 19.
Figure 21:
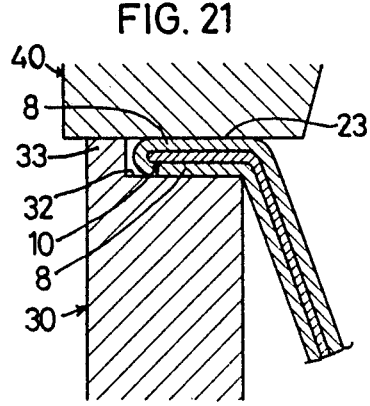

Referring to FIG. 1, a heat-shrinkable laminate 1 comprises a film 2 of a eat-shrinkable synthetic resin and a metallic foil 3 bonded to the film 2 through a bonding layer 4 which is solid with substantially no vacant space.

The heat-shrinkable synthetic resin may be a resin in the polyethylene, polypropylene, vinyl chloride, polystylene or polyester series. Biaxially oriented resins are preferable. They will shrink at a temperature of about 100° C. to about 160° C. The resins should preferably have a large shrinkage percentage of at least 50% (measured by immersing in water at 100° C. for 30 seconds). The film may consist of a single layer or two or more layers laminated.

The metallic foil 3 may be a metal such as aluminum and copper. Also, instead of metallic foil, a metallized plastic film may be used which is a plastic film having one or both sides thereof metallized by vacuum evaporation or sputtering.

The bonding layer 4 may include a discontinuous synthetic resin layer 5 and an adhesive layer 6. It may be formed either by applying a synthetic resin on the metallic foil 3 discontinuously or at intervals to form a synthetic resin layer 5, applying an adhesive over the whole surface to form an adhesive layer 6, and bonding the heat-shrinkable film 2, or by forming the resin layer 5 on the metallic foil 3, applying an adhesive on the whole surface of the heat-shrinkable film 2 to form the adhesive layer 6, and bonding the film 2 and the metallic foil 3 together.

Instead of using an adhesive, the films may be bonded by hot bonding or ultrasonic bonding As shown in FIG. 2, the synthetic resin layer 5 may be formed on the heat-shrinkable film 2. Also, as shown in FIG. 3, the synthetic resin layer 5 and the adhesive layer 6 may be formed so as to alternate with each other.

The synthetic resin layer 5 may be of a thermoplastic synthetic resin which has a sufficient fluidity at the temperature used during heat treatment of the heat-shrinkable film 2 and which should be adhesive at normal temperature, but non-adhesive at the temperature for heat treatment. Vinyl resin, urethane resin, acrylic resin, polyamide resin or silicone resin, or mixture thereof may be used. Acrylic resin is particularly preferable. The synthetic resin may be applied in any desired pattern as shown in FIG. 4 to form the layer 5 which is discontinuous in section in a plurality of directions.

For the adhesive layer 6, an adhesive should be selected which will not flow at the temperature used during heat treatment and can bond firmly the film 2 and the metallic foil 3 together. A two-fluid curing-type adhesive such as those in the polyurethane series is preferable, but a thermoplastic adhesive may be used.

When the laminate 1 is subjected to heat treatment, the heat-shrinkable film 2 will shrink. The metallic foil 3 will wrinkle at the resin layers 5, as shown in FIG. 5, since the film 2 is not bonded there to the metallic foil 3. But, the metallic foil 3 will not wrinkle at the layers 6 because the film 2 is bonded firmly to the metallic foil 3. Air cannot invade the discontinuous resin layer 5 because it is filled with resin.

Referring to FIG. 6, the heat-shrinkable synthetic resin films 2, 2' are laminated to both surfaces of the metallic foil 3 through the bonding layers 4, 4'. The films 2, 2' may be a laminate consisting of two or more films.

A printed layer or a colored layer may be formed on one or both surfaces of the metallic foil 3.

When the heat-shrinkable laminate 1 shown in FIG. 6 thus obtained is heated, the films 3, 3' will shrink as shown in FIG. 7.

Referring to FIG. 8, the heat-shrinkable laminate 1 comprises a layer 7 of a thermoplastic synthetic resin having a metallic foil 3 laminated thereto, and a film 2 of a heat-shrinkable synthetic resin laminated to the layer 7 through the bonding layer 4.

The thermoplastic synthetic resin may be polyethylene, polypropylene, vinyl chloride, polystylene, acryl, polyethyleneterephthalate, or ethylene-vinyl acetate copolymer. Biaxially oriented polypropylene and polyvinyl chloride are preferable. The layer 7 may be either a single layer or a laminate of two or more layers.

The metallic foil 3 may be laminated to the synthetic resin layer 7 by any desired method such as coating, extrusion or bonding.

Referring to FIG. 9, the heat-shrinkable laminate 1 comprises the metallic foil 3, the synthetic resin layers 7 laminated to both sides of the metallic foil 3, and the film 2 of a heat-shrinkable synthetic resin laminated to one of the synthetic resin layers 7 through the bonding layer 4.

Referring to FIG. 10, the heat-shrinkable laminate 1 comprises the metallic foil 3, the synthetic resin layers 7 laminated to both sides of the metallic foil 3, and the films 2, 2' of a heat-shrinkable synthetic resin laminated to both of the synthetic resin layers 7 through the bonding layer 4, 4'.

When the laminate 1 of FIG. 10 is heated, the films 2, 2' will shrink. Since the synthetic resin layers 7 are bonded to the films 2, 2' through the bonding layers 4, 4', fine wrinkles are formed on the layers 7 as the films 2, 2' shrink. Thus, the metallic foil 3, too, will shrink. FIG. 11 shows the laminate 1 of FIG. 10 after heated for shrinkage into the heat-shrunk laminate 10.

Referring to FIG. 12, the laminate 10 thus formed may be used as it is, or a layer 8 of a thermoplastic synthetic resin may be laminated to one side of the laminate 10 having fine wrinkles thereon, by extrusion or hot pressing, or by use of an adhesive. The layer 8 serves as a reinforcing layer, as a sealant, and as a decorative layer according to the application.

The thermoplastic synthetic resin may or may not be the same enumerated for the layer 7.

Referring to FIG. 13, the synthetic resin layers 8 may be provided on both sides of the heat-shrunk laminate 10. The resin layer may be either a single layer or a laminate consisting of two or more layers, as shown in FIG. 14. Numeral 9 designates an adhesive layer for bonding the resin layers 8 to the laminate 10. As the adhesive, an adhesive in the vinyl or urethane series should be used for bonding materials in the vinyl series. An adhesive in the polyurethane series should be used for bonding materials in the polypropylene series. An adhesive is preferable which assures a secure bonding and has some degree of thermoplasticity.

Referring to FIGS. 15 and 16, the heat-shrunk and wrinkled laminate 10 is inserted between dies 11 and 12 and the dies are pressed together Molten thermoplastic synthetic resin is then poured through a nozzle 13. FIG. 16 shows a forming 16 taken out after cooling and solidification. The forming 16 has a layer 14 of poured synthetic resin. It may be formed in any desired shape.

A casing 17 as shown in FIG. 17 can be produced by forming the laminate 10. Letter A designates an electronic part and numeral 15 designates a base plate.

FIG. 18 shows another example of casing 20 produced by forming the laminate 10 by vacuum forming or pressure forming. The casing 20 has a bottom wall 21, a side wall 22, and a flange 23. The casing can be produced in any shape such as round, oval or polygonal. The flange 23 can be omitted.

As shown in FIG. 19, such a casing 20 is mounted on a bearer 30, which is formed with a recess 31 to receive the casing 20 with its flange 23 on a supporting portion 32 of the bearer 30. A slightly higher portion on top of the bearer 30 provides a stopper 33, the height H of which is smaller than the thickness of the flange 23 of the casing 20.

Over the bearer 30, there is a heating plate 40. When the upper surface of the flange 23 of the casing 20 is pressurized and heated with this device, the thermoplastic resin layer 8, 8 in the laminate will melt and flow, covering the edge of the flange 23 and uniting with the other thermoplastic resin layer. Conveniently, the bearer 30 should be so designed as to be heated to facilitate the uniting of the resin layers 8, 8. Resin may be melted by any other method than direct heating, such as ultrasonic heating or induction heating.

This process is applicable to the heat-shrunk laminate in any of the embodiments in the present invention.

What we claim are:

1. A laminate produced by laminating at least one film of a heat-shrinkable synthetic resin to at least one side of a metallic foil or metallized plastic film through a solid bonding layer to form a laminate, and subjecting said laminate to heat shrinkage at a heat shrinkage temperature, characterized in that said solid bonding layer is a composite layer comprising (1) a discontinuous patterned design of a synthetic resin which is in contact with portions of at least one of the two surfaces joined by the solid bonding layer and (2) an adhesive which is in contact with at least portions of both surfaces joined by the solid bonding layer, wherein said synthetic resin flows at said heat-shrinkage temperature and said adhesive maintains its adhesive strength at the heat-shrinkage temperature, and wherein said discontinuous patterned design of synthetic resin and said adhesive form together a solid continuous bonding layer.

2. A laminate as claimed in claim 1, wherein at least one side of said metallized plastic film is covered with a layer of a thermoplastic synthetic resin over the whole surface thereof.

3. A laminate as claimed in claim 1, further comprising at least one layer of a thermoplastic synthetic resin laminated to at least one side of said laminate after heat shrinkage.

4. A laminate as claimed in claim 1, wherein said film of a heat-shrinkable synthetic resin has a shrinkage percentage of at least 50%.

5. A forming produced by forming the laminate as claimed in any of claims 1-3 and 5.

6. A forming produced by forming the laminate as claimed in claim 3 into a casing of a conical shape having a bottom wall, a side wall and an annular flange at top, and heating and pressurizing said flange so that said metallized plastic film at the edge of said flange Will be covered with said thermoplastic synthetic resin.

7. A laminate as claimed in claim 2, further comprising at least one layer of a thermoplastic synthetic resin laminated to at least one side of said laminate after heat shrinkage.

* * * * *